United States Patent Office 2,878,671
Patented Mar. 24, 1959

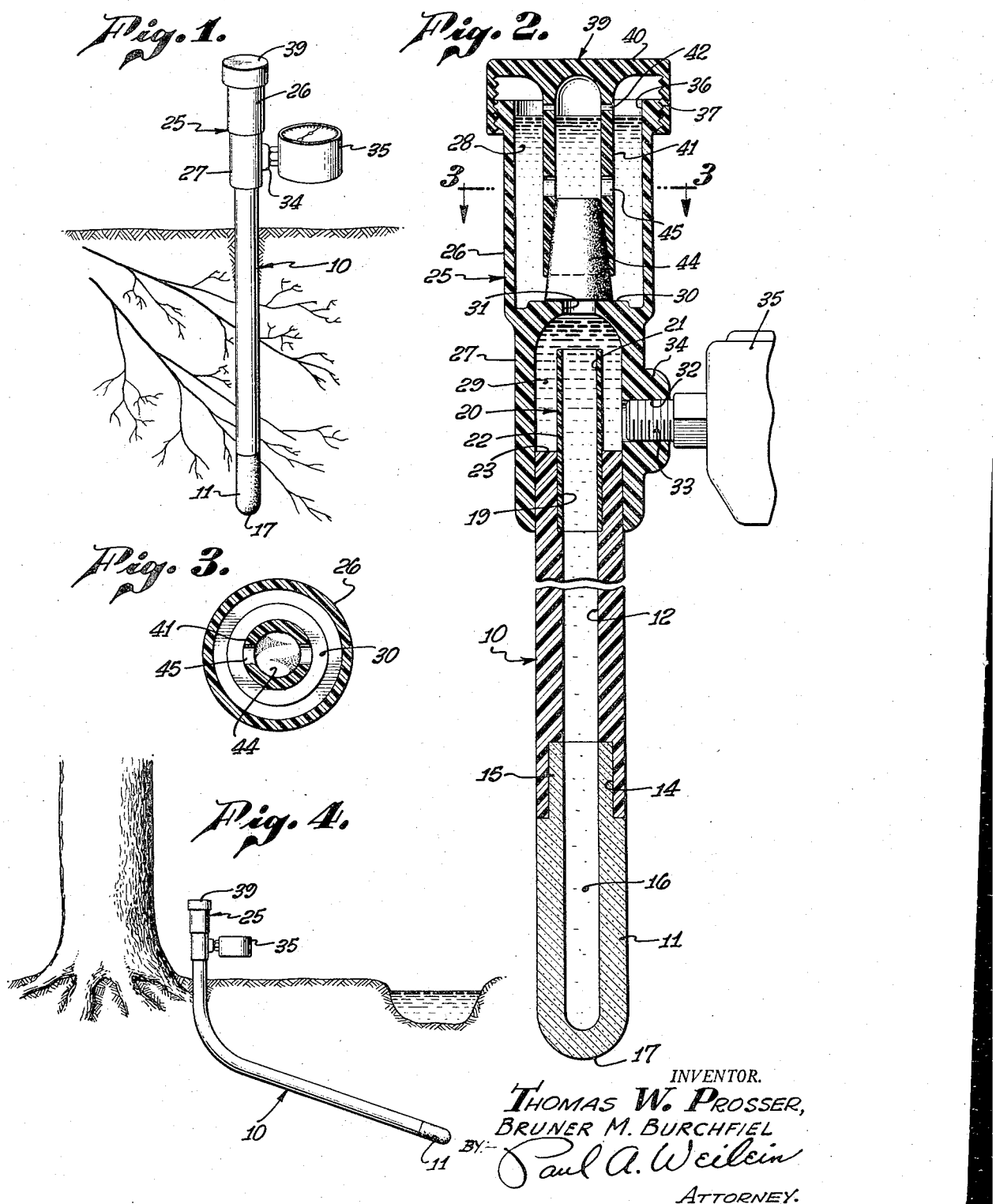
March 24, 1959 — T. W. PROSSER ET AL — 2,878,671
SOIL MOISTURE INDICATING INSTRUMENT
Filed April 9, 1956
INVENTOR.
THOMAS W. PROSSER,
BRUNER M. BURCHFIEL
BY Paul A. Weilein
ATTORNEY.

2,878,671

SOIL MOISTURE INDICATING INSTRUMENT

Thomas W. Prosser and Bruner M. Burchfiel, Riverside, Calif.; said Burchfiel assignor to said Prosser Application April 9, 1956, Serial No. 577,170

11 Claims. (Cl. 73—73)

This invention relates to moisture indicating instruments and more particularly to improvements in soil moisture indicators commonly known as tensiometers.

It is known that soil moisture indicators have been used to determine when and how much to irrigate. However, such instruments are not entirely satisfactory in use as their accuracy is easily impaired and a difficult problem is involved in this connection.

The operation of the instrument is not dependent upon the movement of a large volume of water, but registers the varying force exerted on a substantially static body of water. As this force is registered on the basis of sub-atmospheric readings, the less air present the better.

One of the difficulties with these instruments is keeping them from becoming air bound which reduces their accuracy and sensitivity. Frequently, these instruments lose water and take in air almost as soon as they are installed and put into operation.

Most of this air is sucked in through the ceramic tip from the soil while some of the air is probably dissolved in the soil moisture drawn into the tip following an irrigation. The presence of air in the instrument interferes with the creation of sub-atmospheric pressure in the instrument responsive to changes in the moisture content in the soil, with the result that the accuracy of the instrument is impaired and the response thereof to soil moisture changes is undesirably slow.

In the use of a conventional tensiometer, after each irrigation, air is drawn into the instrument along with water. This air collects in the sight tube where it remains. Then, as the soil dries out, water, being heavier, is drawn out of the instrument by the soil moisture tension. Obviously, this action is cumulative with each successive irrigation cycle and the air bound condition continues to get worse. Unless the air is evacuated frequently and replaced with water, the gauge readings become more and more unreliable.

Moreover, in such a conventional tensiometer, if the servicing thereof is neglected, until the water level therein falls below the gauge, the vacuum created therein will draw the water out of the gauge, thereby making it necessary to refill the instrument with water and then apply a vacuum thereto to evacuate the air that has collected in the gauge. Because of the work involved, there is a tendency for the attendant to be careless about servicing such an instrument with the result that the gauge will be air-bound in the manner above noted.

With the foregoing in mind, it is an object of the present invention to overcome the above difficulties.

It is another object of this invention to provide an instrument of this character which will maintain its accuracy and sensitivity over substantial periods of time.

It is still another object of this invention to provide, in an instrument of this character, means which will prevent or minimize air binding thereof.

It is a further object of the invention to provide means for reducing or minimizing the time required for field servicing the instrument.

It is a still further object of the invention to provide means which will prevent the ceramic tips from becoming sealed or partially sealed due to deposits of salts that have accumulated in the water.

It is another object of this invention to provide a soil moisture indicating instrument having an elongated tubular body of such formation that the portion of the body adapted to stand in a substantially upright position supporting the gauge above the ground, may be located adjacent a tree or in a safe position to one side of the furrow area, while the remaining portion is extended laterally and downwardly therefrom into the ground adjacent the furrow area.

Still another object of the invention is to provide a device of this character which is of transparent plastic material and which may be readily heated and bent so that the tubular portion carrying the ceramic tip may be disposed angularly in the soil.

A further object of the invention is to provide a device of this character having a fluid seal for the gauge.

A still further object of this invention is to provide a device of this character having a reservoir for a reserve supply of water.

Another object of the invention is to provide a novel seal between the reservoir and water column.

While preferred embodiments of this invention are disclosed herewith, it is to be understood that this invention may be carried out in other ways and that it is not limited to the precise details shown, but covers all variations and modifications thereof falling within the scope of the claims appended hereto.

Referring to the drawings:

Fig. 1 is a perspective view of a soil moisture indicating instrument embodying the present invention, said instrument being operably disposed in the soil;

Fig. 2 is an enlarged longitudinal section through said instrument;

Fig. 3 is a cross sectional view taken on line 3—3 of Fig. 2; and

Fig. 4 is a side view of the instrument wherein the upper portion, including the reservoir and gauge, is disposed adjacent a tree trunk while the ceramic tip carrying tubular portion is bent so that said tip is located away from said trunk.

Referring more particularly to the drawings, the instrument comprises a main tube or tubular body, indicated generally at 10, which may be of any suitable length depending upon the depth at which it is desired to have the porous ceramic tip 11. The tubular body 10 has a longitudinal bore or passage 12 therethrough, and the end carrying the ceramic tip is provided with a counterbore 14 in which is received a reduced diameter portion 15 at one end of said tip 11. The bores 12 and 16 are relatively small as is well known. The ceramic tip is of known character, having a longitudinal bore 16 of substantially the same diameter as the bore 12 of the tubular body 10. The end 17 of the ceramic tip, opposite the reduced diameter portion 15, is closed and is exteriorly rounded. The tubular body 10 may be of any suitable material, although it is shown as being of transparent plastic which is advantageous in that it may be warmed and readily bent, if desired. It is to be noted that the diameter of the tubular body and ceramic tip are substantially the same so that these parts may be readily put into the ground in the usual manner and may be readily removed therefrom. The tip may be secured to the tubular body by any suitable means although a plastic cement or adhesive has been found to be effective.

The tubular body 10 has a counterbore 19 at the end opposite the tip 17, in which is disposed one end of a tube 20. The latter has a bore 21 of the same diameter as the diameter of the bore 12, and the free end portion 22 of said tube 20 extends upwardly or outwardly a substantial distance from the upper end 23 of the tubular body 10.

A casing or housing, indicated generally at 25, which also may be of transparent plastic, is provided at the upper end of the tubular body 10 and includes an upper hollow portion 26 and a lower tubular portion 27, the respective interiors 28 and 29 of the portions 26 and 27 being separated by a transverse or horizontal partition 30 having an axial port 31 therein connecting the interior of the portion 26 with the interior of the portion 27. The interior or bore 29 of the portion 27 is of substantially the same diameter as the exterior diameter of the tubular body 10, being sufficiently larger to receive an upper end portion in the lower portion thereof, the parts being secured together by a plastic cement or by any other suitable means. Bore 29 comprises a chamber that is dome shaped at the upper end so as to taper to the port 31 to facilitate escape of air from said chamber through said port, as well as to facilitate flow of water through said port.

Above the upper end 23 of the tubular body 10 the interior of the portion 27 defines a fluid chamber into which extends the upper end portion 22 of the tube 20. The outside diameter of the tube 20 is substantially less than the diameter of the bore 29 and the upper free end of said tube 20 is spaced downwardly from the partition 30. An exterior boss 34 is provided on the wall of the portion 27, said boss having a tapped bore 32 therethrough communicating with the chamber 29 below the upper end of the tube 20. A vacuum indicating device, for example, a vacuum gauge 35, is provided with a nipple 33 threadedly received in the tapped bore 32. Any suitable well known type of vacuum indicating device or gauge may be used, so details thereof are not given herein.

The portion 26 of the housing or casing 25 is of larger diameter than the portion 27 to provide relatively large capacity for chamber 28 which holds up to a year's supply of water. By having the housing of transparent material, the level of liquid in the chamber or reservoir 28 may be seen. If desired, the water used in the instrument may be colored to make it possible to more readily see it. Also, the liquid level in the chamber 29 may be viewed through the transparent walls thereof.

The upper end of the portion 26 is provided with an enlarged annular portion 36 which is exteriorly threaded for threaded reception of the interior threads 37 of a cup shaped cap 39, the threads being loosely associated so that said chamber is vented to atmosphere. Depending from the top wall 40 of the cap is a tube 41, which, when the cap is positioned on the portion 26 of the housing 25, is axially aligned with the port 31. Adjacent the upper closed end of the tube 41 is an opening 42 to vent the upper end of the interior of said tube to the pressure in the upper end of the chamber 28. The lower end of the tube 41 is interiorly tapered from the lower open end, the tapered portion being larger at the bottom, and receives a tapered valve member 44 which may be of rubber, natural or synthetic, plastic, or of any other suitable material. Intermediate the ends of the tube 41 are openings 45, just above the upper end of the valve member 44 to provide liquid communication between the chamber 28 and the interior of the tube 41. The lower end of the valve member 44 extends downwardly of the lower end of the tube 41 and has a horizontal lower end adapted to sealingly engage the upper flat side of the partition 30 about the port 31.

The instrument is water filled when installed and placed in the ground at the desired root zone depth. If the soil is dry, water will be absorbed by the soil from the porous ceramic tip, reducing the volume of water in the instrument and creating a partial vacuum which will register on the gauge, the drier the soil the higher the reading.

An irrigation reverses the action. The vacuum thus created actually draws water back into that portion of the instrument below the port 31. This reduces the vacuum in the portion of the instrument below the port 31 in proportion to the amount of water drawn in from the soil.

As the instrument is water filled to begin with, the water in the chamber 29 serves to seal the gauge against entrance of air. If servicing is neglected, the fluid level in the chamber 29 may lower but will not fall below the top of the tube 20. Thus air cannot enter the vacuum gauge through the bore 32 and nipple 33.

Heretofore instruments had to be pumped out with a hand operated vacuum pump or any other means for applying vacuum whenever the water level dropped below the bore 32 communicating with the gauge. This operation is, however, eliminated by the fluid seal of the present instrument.

The water reservoir, chamber 28, provides a substantial reserve of water from which the chamber 29 and bores 21, 12 and 16 may be easily and quickly supplied. Although the water level in the chamber 29 does not drop below the top of the tube 20, the water level in the bores 21, 12 and 16 will fall below the level in the chamber 29 if servicing is neglected. In order to service the instrument to replace water drawn out through the ceramic tip, the cap 39 is unscrewed about one turn to unseat the valve 44 and permit water in the reservoir 28 to flow through port 31 into said chamber 29 so as to refill the bores 21, 12 and 16 also the dome-shaped portion of the chamber 29. The valve is opened momentarily whereupon the cap is screwed down to reseat the valve 44. The time required to thus refill the instrument is so short that no water in the passages 12 and 16 will leak out through the ceramic tip. This is an important improvement, as in the use of a conventional tensiometer, a greater amount of time is required to fill the instrument and during such time, water will leak out at the porous tip and wet the soil excessively around the tip. This will result in a false reading until the water adjacent the tip has dissipated through the soil and the soil moisture has returned to equilibrium.

It has been found that the reservoir and the fluid seal for the gauge cooperate to insure keeping the instrument from becoming air bound. The fluid seal prevents air entering the gauge, even though the operator is negligent in keeping enough water in the instrument.

Another advantage provided by the present invention is that it minimizes clogging of the ceramic tip. Irrigation water necessarily contains dissolved salts, including fertilizers, by the time it penetrates the soil and reaches the ceramic tip. When such salts are drawn into the instrument they contaminate the water, even if distilled water is used in the instrument to begin with, and these salts are deposited on the plastic walls and in the pores of the ceramic at any time sufficient water is permitted to evaporate to throw them out of solution, a condition resulting from negligent servicing. Also, this dissolved material is conducive to bacteriological growth which appears as a slime and which probably contributes to the problem of clogged tips.

With the present invention, having the reservoir providing for a quick and easy operation to maintain the desired amount of water in the instrument, the water in the instrument is replaced almost as fast as it is drawn out by the soil, so very little water is drawn into the instrument at any time. Consequently, there is always a very low concentration of salts in the instrument and plenty of water to keep them in solution so there is no chance of deposits in the instrument or on the tip.

Substantially all movement of the water is outward. Even if servicing is neglected, water will be drawn out of the instrument as the soil dries, carrying any slight concentration of dissolved salts with it. These salts will either be deposited in the soil surrounding the tip or on the exterior of the tip where it may easily be removed by scrubbing with a stiff brush or sandpaper.

The valve 44 has a number of novel and advantageous features. It will maintain a seal over extended periods of time; it will open freely, positively and quickly without exerting a pull on the water column, and will not release with a snap. This prevention of a snap action in the operation of the valve 44, is important, as it prevents possible damage of the delicate mechanism of the gauge. When opened, it will allow prompt interchange of the air under reduced pressure in the water column tube and the water in the reservoir. Further, it closes easily and quickly without creating any pressure, even momentarily, on the water column.

In the arrangement shown in Fig. 4, the tubular body 10 is shown bent so that the part extending above ground, including the reservoir and the gauge, are located adjacent the trunk of a tree where there is least likelihood of damage to these parts, while the ceramic tip 11 is disposed at a point beneath the irrigation furrow in the area where water seeps into the soil.

It should be noted that in the use of the instrument, as shown in Fig. 4, the upper part of the tubular body 10 to which the gauge is attached is substantially upright whereas the major portion of this body is inclined and joined to the substantially upright part by a curved portion. While the upper part of the body 10 may be inclined somewhat, such inclination should be limited as if it were inclined, for example in the manner of the lower portion of this body, there would be a tendency for the water to run out or be drawn out of the gauge. Thus, in the arrangement substantially as shown in Fig. 4, it is assured that the water will not run out or be drawn out of the gauge and that the latter will respond promptly to changes in the moisture content of the soil and thereby accurately indicate the condition of the soil.

We claim:

1. A soil moisture indicating instrument comprising an elongated body having a longitudinal bore therethrough; a porous tip secured to one end of said body in communication with said bore; said tip having a closed end; a liquid reservoir supported on the other end of said body; means providing a fluid connection between said reservoir and said bore; a vacuum gauge supported by said body; means on said body for communicating said gauge with said bore below said fluid connection; said reservoir having a filling opening; a closure for said filling opening adjustable on said reservoir; and a valve carried by said closure operable to open and close said fluid connection responsive to adjustment of said closure.

2. A soil moisture indicating instrument, including: an elongated tubular member having a bore for a fluid column therein; a porous tip at one end of said tubular member in communication with said bore; said tip having a closed end; means providing a liquid reservoir connected to said tubular member; said reservoir having a filling opening; said reservoir having a discharge port which opens into said bore; a closure for said filling opening bodily adjustable on said reservoir; a valve member connected to said closure and thereby controlling said port responsive to bodily adjustment of said closure; a vacuum gauge connected with said tubular member; and means on said tubular member exteriorly of said bore providing an operative connection of said gauge with said bore.

3. In a soil moisture indicating instrument; an elongated body having a bore therethrough; a porous tip secured to one end of said body and having a bore therein communicating with the bore of said body; said tip having a closed end; means on said body in surrounding relation to the exterior of said bore providing a chamber in communication with said bore and adapted to contain a body of liquid exposed to pressure developed in said bore; a vacuum gauge connected with said chamber to operate responsive to pressure of said body of liquid; a reservoir disposed above said chamber and having a fluid connection with the bore in said body as well as with said chamber; and a manually operable valve controlling said fluid connection.

4. In a soil moisture indicating instrument: an elongated body having a bore therethrough; a porous tip secured to one end of said body and having a bore therein communicating with the bore of said body; said tip having a closed end; means on said body providing an annular chamber surrounding said bore and having an open upper end in communication with the upper end of said bore; said chamber being adapted to contain a body of liquid so that the liquid is exposed to pressures developed in said bore; a vacuum gauge connected with said body in operative communication with said chamber; a reservoir supported by said body above said chamber and having a fluid connection with the bore in said body as well as with said chamber; said reservoir having a filling opening; a closure bodily adjustable on the reservoir to open and close said filling opening; and a valve member carried by said closure for controlling said fluid connection responsive to bodily adjustment of said closure.

5. A liquid supply means for a soil moisture indicating instrument: a reservoir open at the top and having a bottom provided with a discharge port and a valve seating surface surrounding said port; a closure threadedly attached to the top of said reservoir; the threads for attachment of said closure being relatively loose to vent said reservoir to atmosphere; a valve-supporting tube depending from said closure and into said reservoir; the lower end of said tube being spaced upwardly from said bottom; said tube having an air vent adjacent the upper end; said tube having openings below said air vent; and a valve member carried by and closing the lower end of said tube for sealing engagement with said seating surface.

6. A soil moisture indicating instrument, comprising: a tubular body having a longitudinal bore therein; a porous tip secured to one end of said tubular body in communication with said bore; said tip having a closed end; a housing attached to the other end of said tubular body; said housing defining a reservoir open at the upper end; said reservoir having a bottom provided with a port communicating with the bore of said reservoir; said bottom having a flat surface surrounding said port and normal to the axis of said port; a vacuum gauge on said body; means connected with said body providing for an operative fluid connection of said gauge with said bore; a closure for said reservoir, said closure being threadedly attached to the upper end of said reservoir; the threads for attachment of said closure being relatively loose to vent said reservoir to atmosphere; a valve-supporting tube depending axially from said closure and into said reservoir; the lower end of said valve-supporting tube being spaced upwardly from the reservoir bottom, said valve-supporting tube having an air vent adjacent the upper end and openings spaced downwardly therefrom; and a valve member secured to and closing the lower end of said valve-supporting tube; said valve member having a flat surface for sealing engagement with the flat surface surrounding said port.

7. A soil moisture indicating instrument including: a tubular body having a longitudinal bore therein; a porous tip secured to one end of said tubular body; said tip having a closed end; a housing attached to the other end of said tubular body, said housing providing a chamber having a filling opening; means for sealing said filling opening; a wall of said chamber having a gauge-attaching opening therein; a tube open at both ends secured in the bore at said other end of said tubular body and extending upwardly into said chamber with its upper end below said filling opening, said gauge-attaching opening being below the level of said upper end of said tube; said tube having a smaller outside diameter than the inside diameter of said chamber; and a vacuum gauge connected with said chamber through said gauge-attaching opening.

8. A soil moisture indicating instrument, comprising: a tubular body having a longitudinal bore therein; a hollow, porous tip secured to an end of said body, and communicating with said bore; said tip having a closed end; a housing attached to the other end of said body, said housing providing a chamber and a reservoir above said chamber separated therefrom by a transverse partition; said partition having a port connecting said chamber and reservoir; the upper end of said reservoir being open; said housing having a gauge-attaching opening therein below said partition; a tube open at its ends secured to said other end of said tubular body and extending upwardly into said chamber; the upper end of said tube being spaced from said partition; said gauge-attaching opening being below said upper end of said tube; said tube having a smaller outside diameter than the inside diameter of said chamber; a vacuum gauge connected with said chamber through said gauge-attaching opening; a closure for said reservoir threadedly attached to the upper end of said reservoir; a valve-supporting member depending from said closure and into said reservoir; and a valve secured to the lower end of said valve-supporting member operable to open and close said port responsive to manipulation of said closure.

9. A soil moisture indicating instrument, comprising: a tubular body having a longitudinal bore therein; a porous tip secured at one end to one end of said body; said tip having a longitudinal bore therein communicating at the attached end with the bore of said tubular body and closed at the free end thereof; the bores of said tubular body and said tip being adapted to contain a liquid column; a housing attached to the other end of said tubular body; said housing defining a chamber and a reservoir separated by a transverse partition having a port therein connecting said chamber and reservoir; the upper end of said reservoir being open; said housing having a gauge attaching opening therein below said partition; a tube open at its ends secured to said other end of said tubular body and extending upwardly into said chamber with its upper end spaced downwardly from said partition and spaced upwardly from said gauge-attaching opening; said tube having a smaller outside diameter than the inside diameter of said chamber; a vacuum gauge connected with said chamber through said gauge-attaching opening; a closure cap for said reservoir, threadedly attached to the upper end of said reservoir, the threads for attachment of said cap being relatively loose to vent said reservoir to atmosphere; a valve-supporting tube depending from said cap into said reservoir; the lower end of said valve-supporting tube being spaced upwardly from said partition; said valve-supporting tube having an air vent adjacent the upper end and openings spaced downwardly therefrom; the lower end of said valve-supporting tube being open; and a valve member mounted in said lower end of said valve supporting tube; the lower end of said valve member being flat for sealing engagement with said partition around said port.

10. A soil moisture indicating instrument including: an elongated body having a longitudinal bore therethrough; said body having an upright portion and a downwardly and laterally inclined lower portion joined to said upper portion by a curved portion; a porous tip secured to the lower end of said lower portion so as to be in communication with said bore; said tip having a closed free end; closure means for the upper end of said upper portion; a vacuum gauge mounted on said upper portion; means on said upright portion providing an annular liquid receiving chamber surrounding said bore; said chamber having a bottom wall; said chamber having an open upper end in communication with the upper end of said bore; means providing for communication of said gauge with said chamber; a reservoir mounted on said upright portion; and means for establishing communication of said reservoir with said chamber and said bore.

11. A soil moisture indicating instrument including: an elongated body having a longitudinal bore therethrough; said body having an upright upper portion and a lower portion inclined downwardly and laterally from the lower end of said upright portion; a porous tip mounted on the lower end of said inclined portion in communication with said bore; said tip having a closed free end; means providing a liquid-containing chamber in surrounding relation to said upright portion of said body; said chamber having a bottom wall below the upper end of said bore; said chamber having an open upper end in communication with the upper end of said bore; a pressure gauge; means communicating said gauge with said chamber between said bottom wall and said open upper end of said chamber; a reservoir having a bottom wall located above the upper end of said bore and cooperable with said chamber providing means to close the upper end of said chamber; said bottom wall having a port therein; and valve means operable in the reservoir to open and close said port.

References Cited in the file of this patent

UNITED STATES PATENTS

| | | |
|---|---|---|
| 2,023,490 | Richards | Dec. 10, 1935 |
| 2,277,534 | Thompson | Mar. 24, 1942 |
| 2,483,656 | Marschalk | Oct. 4, 1949 |
| 2,635,459 | Gray | Apr. 21, 1953 |

FOREIGN PATENTS

| | | |
|---|---|---|
| 435,815 | Germany | Oct. 18, 1926 |
| 158,349 | Australia | Aug. 19, 1954 |